March 29, 1960 L. C. WEATHERS ET AL 2,930,945

POWER TRANSMISSION

Filed Aug. 16, 1956 2 Sheets-Sheet 1

*INVENTORS*
LELAND C. WEATHERS
JOSEPH S. PASZEK
BY
*Van Meter and George*

ATTORNEYS

March 29, 1960   L. C. WEATHERS ET AL   2,930,945
POWER TRANSMISSION
Filed Aug. 16, 1956   2 Sheets-Sheet 2

INVENTORS
LELAND C. WEATHERS
JOSEPH S. PASZEK
BY
Van Meter and George
ATTORNEYS

United States Patent Office 2,930,945
Patented Mar. 29, 1960

2,930,945

POWER TRANSMISSION

Leland C. Weathers, Plymouth, and Joseph S. Paszek, Detroit, Mich., assignors to Vickers Incorporated, Detroit, Mich., a corporation of Michigan Application August 16, 1956, Serial No. 604,517

8 Claims. (Cl. 317—172)

This invention relates to power transmissions, and more particularly to a power transmission of the so-called "torque motor" type in which an electrical input signal generates a mechanical force output.

The technology of automatic control systems has advanced rapidly in recent years. Much of this advance is attributable to the development of the polarized torque motor which makes possible the accurate control of forces of great magnitude through the application of very minute input signals. Such torque motors are used on virtually every missile and high speed aircraft. Further, they are finding constantly increasing application in automatic control systems for industrial machinery, and in fact, wherever it is desired to control forces of large magnitude with small input signals.

The basic principles of the polarized torque motor are discussed in the book "Electro Magnetic Devices," pages 498 and 499, by Herbert C. Roters, published in 1941 by John Wiley and Sons, Incorporated.

Probably the widest field of use for the polarized torque motor has been as an actuator for the pilot stage of an electro-hydraulic servo valve. A common type of these valves utilizes a flapper, or control member, to variably impede fluid flow through an orifice, or orifices, utilizing the pressure variations thus created to control a large, main directional valve. In another widely used type of electro-hydraulic servo valves, the torque motor is coupled to a pilot valve spool which controls shifting of a main valve spool. In such servo valves the movement of the flapper, pilot valve, or controlling member may be of quite small magnitude although, as a general rule, the greater the length of the controlling movement, relative to the controlled movement, the greater will be the precision of control of the valve. It is thus highly desirable that the torque motor which produces the input signal be capable of sufficient movement, or stroke, to provide a control system of the desired operating characteristic, and one in which manufacturing tolerances are not so highly critical since movements are greater.

An addtional criterion of a good torque motor is that it have a flat torque-versus-displacement curve. That is, the torque motor should produce the same available torque at the beginning and the end of its stroke and it should do this without appreciable variation between those two points.

Prior art torque motors have the ability to maintain substantial constancy of torque versus displacement, or linearity, only over a very limited stroke range. As heretofore noted, a small full-range controlling movement has a detrimental effect on the control system, and also requires much greater accuracy in construction of valve parts.

Torque motors for use in missiles and aircraft must, of course, be small in size, and light in weight. It has been one of the disadvantages of the prior art torque motors that, in order to obtain the required force output, they have been quite large and heavy. Much of this size and weight results from the use of the large magnets which have been required to produce the necessary permeance in the pulling gaps.

It is an object of this invention to provide a torque motor having greatly improved operating characteristics.

More particularly it is an object of this invention to provided such an improved, long stroke torque motor having a flat torque-versus-displacement curve, and in which the available torque at the end of the stroke is substantially the same as that available in the neutral position.

It is also an object of this invention to provide such an improved torque motor which, for any given torque capacity, is smaller in size and lighter in weight than the comparable prior art torque motors.

Further objects and advantages of the present invention will be apparent from the following description, reference being had to the accompanying drawings wherein a preferred form of the present invention is clearly shown.

Figure 1:
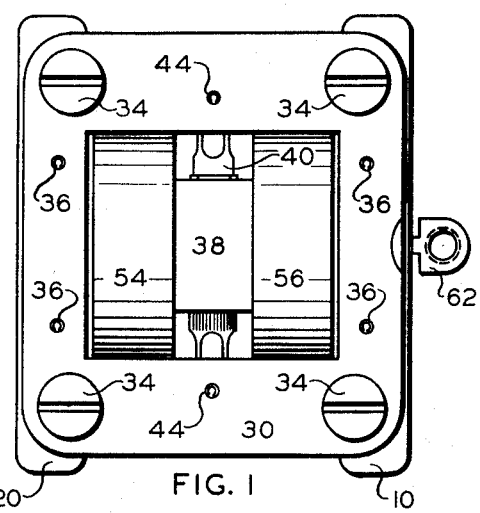
Figure 1 is a top elevation view of a torque motor incorporating the present invention.
Figure 4:
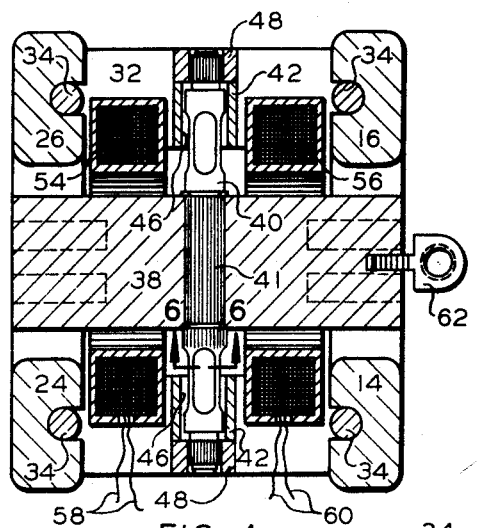
Figure 4 is a section taken on line 4—4 of Figure 2.
Figure 2:
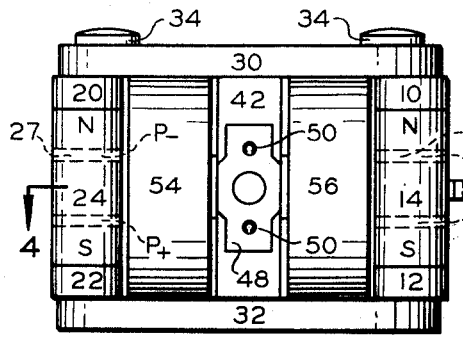
Figure 2 is an end view of the torque motor shown in Figure 1.
Figure 3:
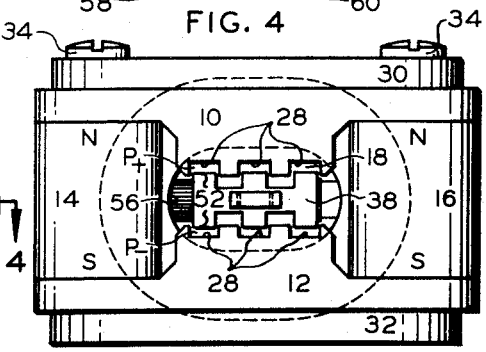
Figure 3 is a side view of the torque motor in Figure 1.

Referring first to Figure 3, the improved torque motor includes a pair of pole pieces 10 and 12, which abut a pair of permanent magnets 14 and 16. The length of permanent magnets 14 and 16 is selected to give the desired spacing between pole pieces 10 and 12. Pole pieces 10 and 12 form therebetween an air gap generally designated 18. A pair of similar pole pieces 20, 22, abut a second pair of magnets 24 and 26 to form a second air gap 27, which is identical to gap 18.

The pole pieces 10 and 12 are slotted, or recessed, at 28. For each recess 28 in pole piece 10 there is an opposed recess 28 in pole piece 12. Pole pieces 20 and 22 are similarly recessed.

The frame of the torque motor includes a pair of hollow, rectangular upper and lower plates 30 and 32 which rest on the pole pieces 10 and 12, and 20 and 22. The magnets, pole pieces, and upper and lower plates, are held together by non-magnetic screws 34 which extend from the plate 30 into tapped holes in the plate 32. To permit proper alignment of pole pieces 10 and 12, and pole pieces 20 and 22, they are provided with clearance around the screws 34 so that in the assembly operation the pole pieces can be shifted to accurately align the opposed recesses 28. When proper alignment has been obtained, the parts are held in place and holes are drilled through the plates 30 and 32 into the pole pieces, and roll pins 36 are then inserted. Screws 34 are then tightened to complete the assembly of the frame. As heretofore noted, accurate control of the width of air gaps 18 and 27 are easily obtained by merely holding the magnets to the proper height.

An armature 38 is mounted in the torque motor on a shaft 40. Armature 38 is locked to shaft 40 by engagement with serrations 41. Shaft 40 is carried by a pair of struts 42 which extend between the upper and lower plates 30 and 32, and are retained in place by roll pins 44. Struts 42 have clearance holes 46, through which the shaft 40 extends. A pair of clamps 48 are non-rotatably pressed on the outer ends of shaft 40. In assembling the torque motor, the armature 38 has the clamps 48 and shaft 40 may be shifted to align the armature properly with the air gaps 18 and 27. When this alignment has been effected, holes are drilled through the clamps 48 into the struts 42, and roll pin 50 are inserted to maintain the proper position of armature 38.

Armature 38 includes a plurality of extending parts, or teeth, 52 one of which extends toward each of the recesses 28. In the center position of armature 38 each of these teeth extends a distance into one of the recesses 28.

A pair of armature coils 54 and 56 encircle armature 38 on opposite sides of the shaft 40. A pair of leads 58 extend from the coil 54 and a pair of leads 60 extend from the coil 56. Control currents supplied to leads 58 and 60 control the operation of the torque motor as will be hereinafter described.

A connection member 62 is secured to the armature 38 to permit connection of the torque motor to an element to be operated.

Figure 6:
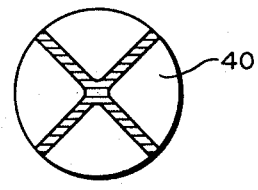
Figure 6 is an enlarged section taken on line 6—6 of Figure 4.

In addition to supporting armature 38, shaft 40 acts as a torsional spring, that is, armature 38 can pivot about the axis of shaft 40, but angular movement away from the center position is resisted by a force proportional to the magnitude of the movement, and is developed by torsion forces in the shaft 40. Shaft 40 is provided with a cross section which provides the required resistance to physical displacement of armature 38, while at the same time providing the desired spring rate in opposing rotation. A sectional view of one of the torsion spring portions of shaft 40 is shown in Figure 6.

Figure 5:
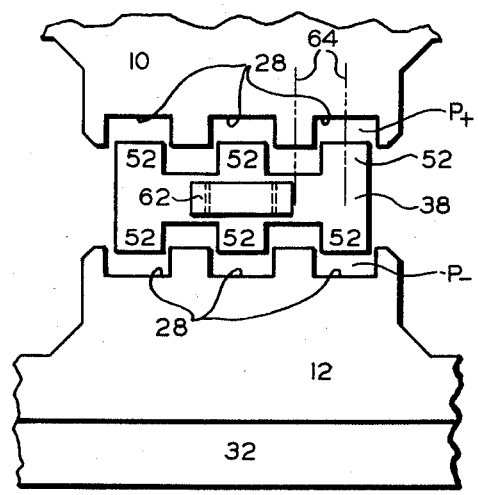
Figure 5 is an enlarged view of part of Figure 3.
Figure 8:
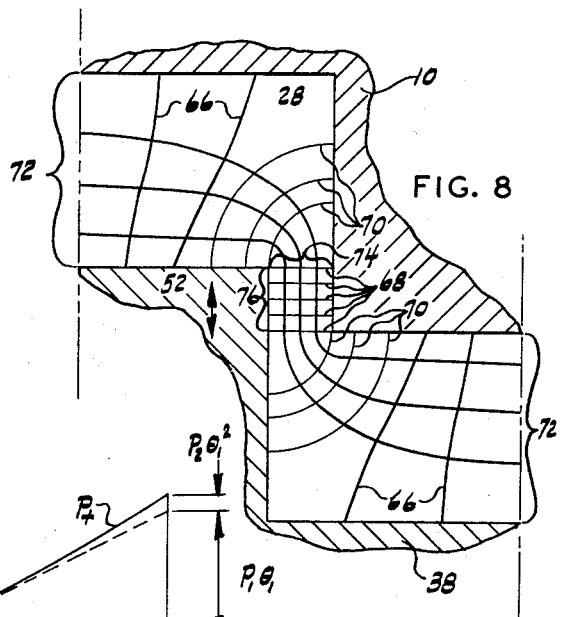
Figure 8 is an enlarged view of one-half of one of the air gaps in the torque motor of Figure 1.

The pulling gaps of the torque motor are formed between the toothed ends of the armature 38 and the recessed pole pieces 10, 12, 20 and 22. Four identical pulling gaps are thus formed, the two identified as P-plus pulling against the two identified as P-minus. The present invention resides in the conformation of the pulling gaps. Figure 8, which is an enlargement of the area 64 of Figure 5, shows a portion of one of the pulling gaps. Figure 8 includes a schematic plot of the various flux paths through the pulling gap. These flux paths can be divided into three general classes. First, the paths indicated at 66 which are substantially parallel to the path of movement of armature 52, second, those paths which are perpendicular to the path of movement of armature 52 which are indicated at 68, and third, the corner flux indicated at 70.

It will be seen that each of the gaps P-plus and P-minus are composed of a plurality of portions 72 which vary in length with movement of armature 52 and a plurality of gaps 74 which do not change in length as armature 52 moves. The portions 72 of the gaps, wherein armature movement is substantially parallel to the flux path, may be termed inverse gaps, and the portions 74 wherein armature movement is substantially perpendicular to the flux path, may be termed linear gaps. The prior art torque motors have utilized either an inverse gap or a linear gap. Where the inverse gap alone is used, the torque motor is theoretically capable of controlled movement against a resilient force only through a distance of approximately ⅓ of the length of the inverse gap. If such a torque motor is operated over a greater range, it will lock in, that is the armature will go out of control and snap to its maximum displacement position. Thus where a torque motor includes only an inverse gap, the length of the gap must be at least three times the desired travel. Such an arrangement is both magnetically inefficient and space consuming. Further, due to the inverse nature of the gap, linearity of avail-able-torque versus displacement is impossible to attain.

Torque motors having only a linear gap have the advantage over the inverse type of providing a more nearly linear torque-versus-displacement curve, however, due to a number of factors, including saturation of the magnetic components and armature reaction, the available torque falls off as the armature displacement increases. It is thus impossible to attain linearity of torque output with the linear gap torque motor.

The present invention contemplates a combination of the inverse and linear gaps so as to produce a substantially flat torque-versus-displacement curve throughout a relatively long operating stroke. In the present invention the linear portion 74 of the pulling gaps P-plus and P-minus provides the major portion of the pulling force. The inverse portion of the gap contributes to the total torque output only that amount of force required to offset the drop in pulling force of the linear portion of the gap which is encountered during movement of the armature away from the center position. In a torque motor built in accordance with the present invention, it has been found possible to maintain substantial linearity of torque versus displacement throughout a range of armature travel such that the teeth 52 can be pulled completely out of the recesses 28 for a distance equal to the mid-position penetration indicated at 76 in Figure 8.

Figure 7:
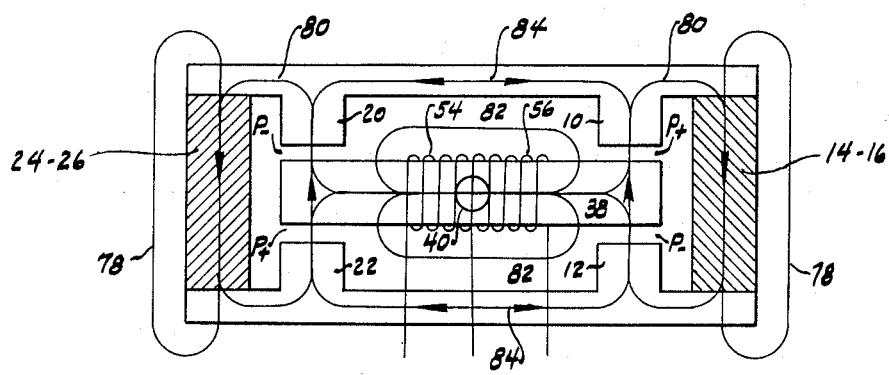
Figure 7 is a schematic drawing of the torque motor of Figure 1.

Referring to the schematic layout of the torque motor shown in Figure 7, the magnets 24 and 26, and 14 and 16, produce a flux which divides into a leakage flux path indicated at 78, and a flux path 80 which passes through the pole pieces and across the working gaps P-plus and P-minus. The coils 54 and 56 provide ampere turns for inducing a control flux in the armature 38 which divides between leakage paths 82 and a pair of working paths 84.

When equal currents flow in coils 54 and 56, the magnetic fluxes they produce will neutralize each other and the armature 38 will be retained in the center position by the torsional spring effect of shaft 40. When the currents in coils 54 and 56 are unbalanced, the resulting effective armature flux will tend to cause pivotal movement of armature 38 either into the P-plus gaps or the P-minus gaps, against the torsional, resilient centering force provided by shaft 40.

Due to the complex nature of the flux paths in the pulling gaps (see Figure 8) it is virtually impossible to analytically derive a general equation for permeance of the pulling gaps. However, the permeance of our pulling gaps, within the operating range, can be expressed by the following second degree polynomial, empirical formulas:

$$P_+ = P_0 + P_1\theta + P_2\theta^2$$
$$P_- = P_0 - P_1\theta + P_2\theta^2$$

where:

$P_+$ and $P_-$ are the permeances of the pulling gaps $P_+$ and $P_-$, respectively;

$P_0$ is the mid-position gap permeance;

$P_1$ and $P_2$ are constants; and $\theta$ is the angle of armature displacement from the center position, about the axis of shaft 40

Figure 9:
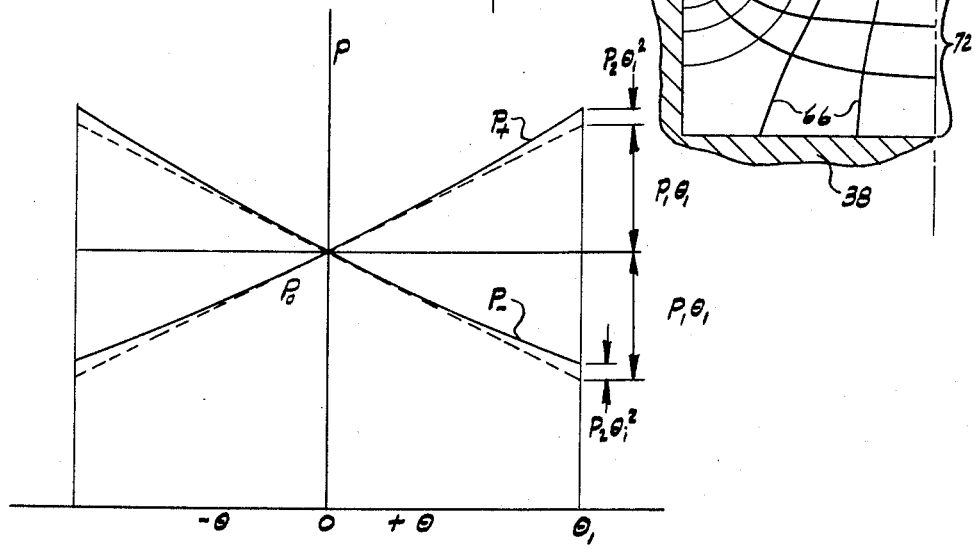
Figure 9 is a curve illustrating the operating characteristics of a torque motor incorporating the present invention.

These quantities are graphically portrayed in Figure 9, wherein permeance (P) is plotted against armature displacement from the center position ($\theta$).

The torque obtainable from each pulling gap in our torque motor is proportional to the first derivative of the gap permeance with respect to armature movement. Since $$\frac{dP_+}{d\theta} = P_1 + 2P_2\theta$$

and $$\frac{dP_-}{d\theta} = -P_1 + 2P_2\theta$$

the pulling gaps are to be so proportioned that $2P_2\theta$ maximum will be of such a magnitude that torque available at the end of the armature stroke will equal torque available at the mid position.

The practice of the present invention provides an improved torque motor which is small in size and light in weight, and which has a flat torque-versus-displacement curve over a relatively long stroke.

While the form of embodiment of the invention as herein disclosed constitutes a preferred form, it is to be understood that other forms might be adopted, all coming within the scope of the claims which follow.

What is claimed is as follows:

1. In a torque motor, the combination of: a yoke having opposed pole faces forming a gap therebetween, said gap including a recess of limited depth in at least one of said pole faces; magnetic means for polarizing the yoke and producing a field flux in said gap; an armature disposed in said gap, said armature having a tooth thereon proportioned to permit entry into said recess; means for mounting said armature in said gap in a neutral, centered position in which said tooth extends partially into said recess and so as to permit movement of said tooth further into said recess and resiliently resist such movement; and means for producing a variable, magnetic control flux in said armature.

2. In a torque motor, the combination of: a yoke having opposed pole faces forming a gap therebetween, said gap including a plurality of spaced apart recesses of limited depth in at least one of said pole faces; magnetic means for polarizing the yoke and producing a field flux in said gap; an armature disposed in said gap, said armature having a plurality of spaced apart teeth thereon proportioned to permit entry of one of said teeth into each of said recesses; means for mounting said armature in said gap in a neutral, centered position in which said teeth extend partially into said recesses and so as to permit movement of said armature teeth further into said recesses and resiliently resist such movement; and means for producing a variable, magnetic control flux in said armature.

3. In a torque motor, the combination of: a yoke having opposed pole faces forming a gap therebetween, said gap including a recess of limited depth in one of said pole faces, and a complementary, opposed recess of limited depth in the other of said pole faces; magnetic means for polarizing the yoke and producing a field flux in said gap; an armature disposed in said gap, said armature having teeth thereon proportioned to permit entry into each of said recesses; means for mounting said armature in said gap in a neutral, centered position in which said teeth extend partially into said recesses and so as to permit movement of said teeth further into said recesses and resiliently resist such movement; and means for producing a variable, magnetic control flux in said armature.

4. In a torque motor, the combination of: a yoke having opposed pole faces forming a gap therebetween, said gap including a plurality of spaced apart recesses of limited depth in one of said pole faces, and a plurality of complementary recesses of limited depth in the other of said pole faces, one of said complementary recesses being disposed opposite each of the recesses in said one pole face; magnetic means for polarizing the yoke and producing a field flux in said gap; an armature disposed in said gap, said armature having a plurality of spaced apart teeth thereon proportioned to permit entry of one of said teeth into each of each said recesses; means for mounting said armature in said gap in a neutral, centered position in which said teeth extend partially into said recesses and so as to permit movement of said teeth further into said recesses and resiliently resist such movement; and means for producing a variable, magnetic control flux in said armature.

5. In a torque motor, the combination of: a yoke having opposed pole faces forming a gap therebetween, said gap including a recess of limited depth in at least one of said pole faces, said recess having a pair of substantially parallel sides; magnetic means for polarizing the yoke and producing a field flux in said gap; an armature disposed in said gap, said armature having a tooth thereon proportioned to permit entry into said recess said tooth having a pair of sides substantially parallel to said sides of said recess; means for mounting said armature in said gap in a neutral, centered position in which said tooth extends partially into said recess and so as to permit movement of said tooth further into said recess and resiliently resist such movement; and means for producing a variable, magnetic control flux in said armature.

6. In a torque motor, the combination of: a yoke having opposed pole faces forming a gap therebetween; magnetic means for polarizing the yoke and producing a field flux in said gap; a resiliently centered armature disposed in said gap and, in the resiliently centered position, forming with at least one of said pole faces a pulling gap comprising both linear and inverse gaps; and means for producing a variable, magnetic control flux in said armature.

7. In a torque motor, the combination of: a pair of yokes having opposed pole faces forming gaps therebetween; magnetic means for polarizing the yokes and producing a field flux in said gaps; a resiliently centered armature pivotally mounted at a point located between said yokes and, in the resiliently centered position, forming with at least two of said pole faces pulling gaps comprising both linear and inverse gaps; and means for producing a variable, magnetic control flux in said armature.

8. In a torque motor, the combination of: a pair of yokes having opposed pole faces forming gaps therebetween; magnetic means for polarizing the yokes and producing a field flux in said gaps; a resiliently centered armature pivotally mounted at a point located between said yokes and, in the resiliently centered position, forming with each of said pole faces pulling gaps comprising both linear and inverse gaps; and means for producing a variable, magnetic control flux in said armature.

References Cited in the file of this patent

UNITED STATES PATENTS

| | | |
|---|---|---|
| 2,764,703 | Anton | Sept. 25, 1956 |
| 2,784,327 | Drescher | Mar. 5, 1957 |

FOREIGN PATENTS

| | | |
|---|---|---|
| 551,790 | Great Britain | Mar. 10, 1943 |
| 744,965 | Germany | Feb. 22, 1944 |